July 13, 1965 E. J. NELSON 3,194,662
METHOD OF DEEP FAT FRYING AND COOKING
Filed June 4, 1963 2 Sheets-Sheet 1

INVENTOR.
EDWARD J. NELSON,
BY Max Wall

ATTORNEY.

July 13, 1965   E. J. NELSON   3,194,662
METHOD OF DEEP FAT FRYING AND COOKING
Filed June 4, 1963   2 Sheets-Sheet 2

INVENTOR.
EDWARD J. NELSON,
BY
ATTORNEY.

United States Patent Office 3,194,662
Patented July 13, 1965

3,194,662
METHOD OF DEEP FAT FRYING
AND COOKING
Edward J. Nelson, Omaha, Nebr., assignor to Ballantyne Instruments and Electronics, Inc., Omaha, Nebr., a corporation of Delaware
Filed June 4, 1963, Ser. No. 285,428
2 Claims. (Cl. 99—1)

This invention relates to a method and apparatus for cooking foods, particularly by the deep fat frying process. Deep fat frying of foods has become especially popular, particularly in public eating places where large volumes of cooked food are sold continuously, requiring the constant and thorough preparation of food within a minimum of time. In the deep fat frying of chicken, for example, it is now possible to prepare the chicken from raw to completely cooked in from 8 to 10 minutes. Various types of pressure frying apparatus have been designed to accomplish this. In this type of apparatus, as now commercially known, the kettle, when containing a suitable volume (about 45 lbs.) of fat, will support approximately 12 lbs. of chicken which has been cut into pieces, or approximately 60–70 pieces.

In preparing chicken for cooking by methods now practiced, the pieces are first marinated in a saline solution for a suitable period of time, not to exceed 15 minutes, and are then rolled in, or otherwise coated with, a breading composition or batter. This forms a moist paste on the surface of the food pieces. They are then immersed in the fat in a closed container at high temperature. The high temperature causes the moisture of the marinating solution and the moisture of the food itself to rapidly turn to steam, which raises the pressure in the cooking kettle to approximately 14 lbs. p.s.i., and cooks the food within the time limits mentioned. By this method of cooking, the high heat of the fat quickly sears the surface of the food, locking the natural moisture and juices in the food to make it tender, juicy and extremely palatable. The pressure of the steam causes the heat to penetrate quickly and deeply into the food and quickly cooks it thoroughly right to the bone.

The method works quite well when a large volume of food is cooked, as when the kettle is full, or approximately full to capacity, the volume of moisture present is sufficient to fill with steam the open area of the kettle between the fat level and the lid or cover for the kettle. In a kettle normally containing about 45 lbs. of hydrogenated fat, at least 3 or 4 lbs. of product is needed to yield the moisture required to build up the pressure to about 12 lbs. p.s.i. When smaller quantities are cooked, there is not enough moisture in or on the food to build up the needed pressure in the open area, so that the heat does not penetrate into the product, the juices are not sealed in, and a much longer time is required to cook the food, thereby losing the principal advantage of the pressure fryer.

It frequently occurs in a restaurant, hotel, club or other eating place that only one or two small individual orders for food may be requested from time to time before, during or after regular mealtimes. Since the small amount of food required to fill such individual orders would contain insufficient moisture, when cooked in the large kettle and in the manner described above, to generate enough steam to create the pressure necessary in the space available to cook the food thoroughly in a short space of time, some means was found necessary to supplement or supplant the steam pressure generated from the moisture developed when larger quantities of food are cooked.

While it is desirable to have moisture present in the kettle, it has been found that air pressure will work effectively without moisture, or with a minimum of moisture.

The present method and apparatus were designed to overcome the foregoing problem, and air pressure is used to supplement the steam pressure, so that ample pressure in the kettle is always available to ensure speedy and thorough cooking of the food, regardless of the amount of food in the kettle. As the result of this invention, it is possible to prepare food, such as chicken, for example, with identical consistency and brown color time after time. It is also possible to cook any quantity of product within the capacity of the cooking vessel or kettle, from one small piece to its full limit in a uniform and identical manner, and to repeat this performance as often as desired. Thus, one piece of chicken or 60 pieces may be cooked from the raw state to completely done in approximately 8 minutes at a temperature from about 320° F. to 325° F. The practice of the method outlined herein eliminates the necessity for varying cooking times or temperature and insures the palatability and uniformity of the product. This can be a tremendous advantage to a restaurant operator, or to any establishment serving food to large and small numbers of people at different times.

The principal object of the present invention, therefore, is to provide efficient and economical means to supplement the steam pressure in the kettle by means of air pressure.

A further object of the invention is to accomplish this without in any way contaminating the frying fat or the food itself.

Still a further object is to provide means for accomplishing this which may readily be installed in currently available pressure frying machines.

These and further objects will be more readily understood by reference to the accompanying drawings and specification, wherein one practical embodiment of the invention is illustrated and described in more detail.

Figure 1:
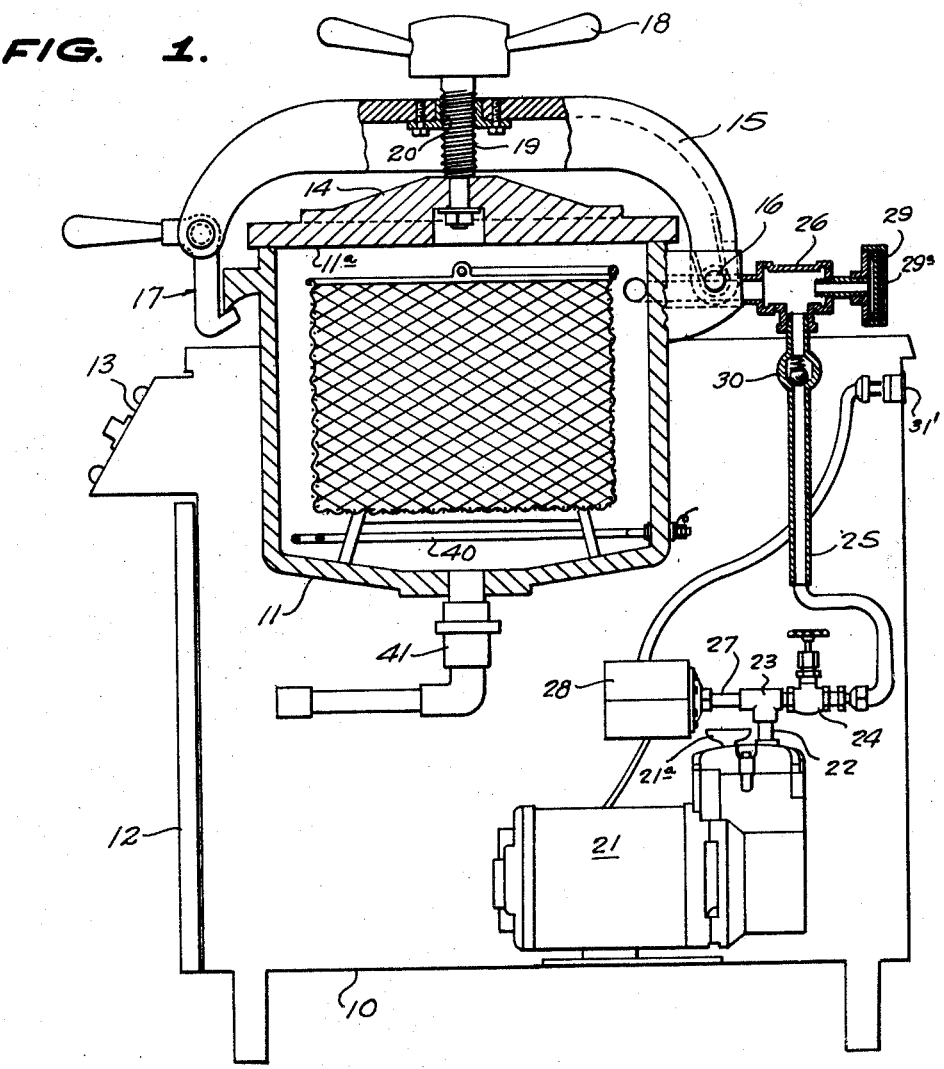
FIGURE 1 is a side elevation of a pressure frying machine, with parts shown in section, embodying the present invention.
Figure 4:
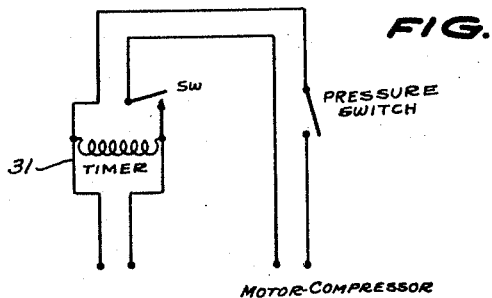
FIGURE 4 is a schematic drawing showing the timing circuit in series with that of the pressure switch and motor-compressor unit.
Figure 2:
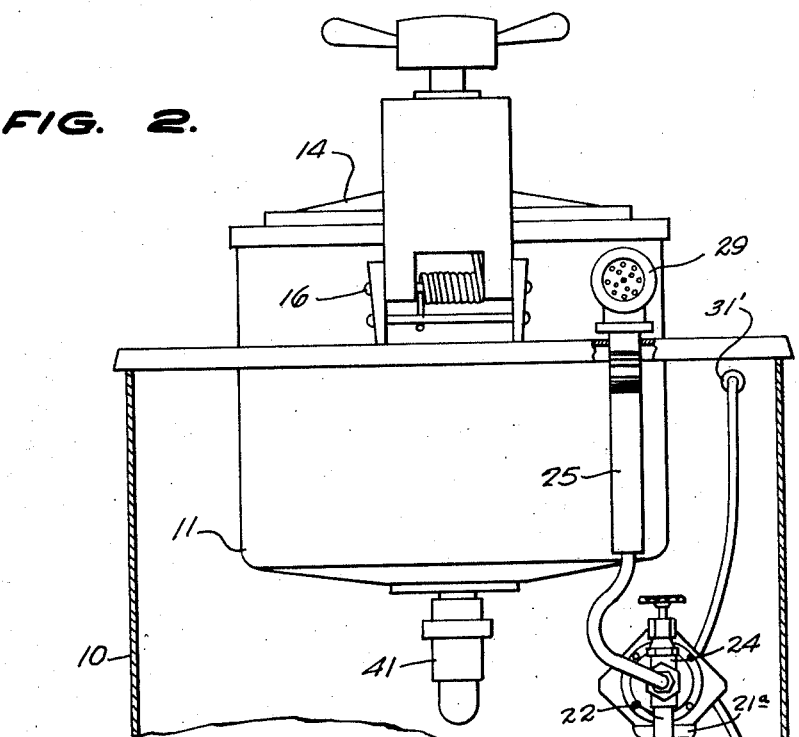
FIGURE 2 is a rear elevation of the machine shown in FIGURE 1.

In the drawings, 10 designates the cabinet which houses the cooking kettle 11 and the air pressure creating equipment about to be described. Access to the interior of the cabinet is obtained through the front door 12. A control panel is shown at 13, which supports the various switches and control members for the various operations of the machine. The kettle 11 is provided with a sealing lid 14 controlled by a clamp member 15 which is pivoted to the kettle at 16 and locked thereto at its other end 17 in a manner which will be understood by those skilled in the art. The lid 14 is secured to the kettle with a pressure tight fit around the upper edge thereof by means of a handle 18 operating on a screw 19 turning in a threaded bore 20 of the clamp member 15. Turning the handle 18 in one direction forces the lid 14 against the upper rim 11a of the kettle in a pressure tight seal, and turning it in the opposite direction releases the lid so that it may be opened by swinging the clamp member 15 about its pivot 16.

An electrically driven motor-compressor unit is shown at 21, which supplies air under pressure to the kettle 11 by means of nipple 22, T 23, shut-off valve 24, conduit 25, to T 26. The nipple 27, taken off the T 23, leads to pressure operated switch 28. One side of the T 26 leads to the kettle 11 and the other side leads to a safety pressure relief valve 29 which houses a frangible disc 29a constructed and arranged to fracture and exhaust pressure from the kettle when this pressure exceeds a predetermined value. A one-way check valve 30 in the conduit 25 prevents back flow of air-pressure from the kettle to the compressor. The compressor is provided with an intake filter 21a. The kettle 11 which supports the cooking fat is provided with an electrical heating element 40 and means 41 for draining the fat after a period of use.

Figure 3:
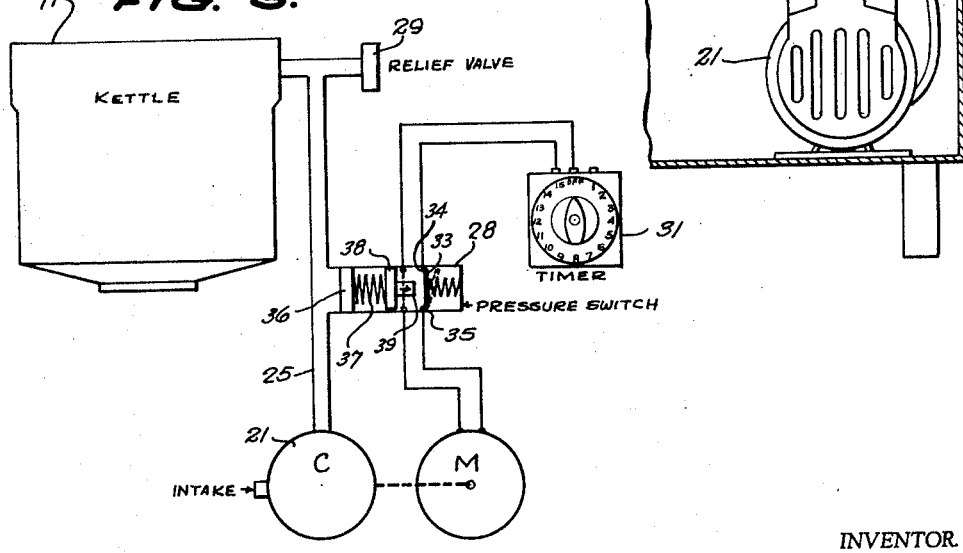
FIGURE 3 is a schematic diagram of the operating circuit for the pressure supplying means.

Referirng now to FIGURE 3, a timing mechanism 31 is mounted on the control panel 13 of the cabinet 10, the mechanism being electrically connected to the compressor 21 through pressure switch 28. The compressor and switch are suitably connected to a source of electric current as indicated at 31', FIGURE 1. The pressure switch 28 includes a normally closed spring controlled contact member 33 operating across terminals 34 and 35, on one side of the line. A collar 36 in the switch on the other side of the line supports a tension spring 37 which is connected to a sliding plunger member 38, the latter having a centrally positioned button 39 which is adapted to engage the normally closed contact member 33 under operating conditions. Air pressure in the conduit 25 exerted against the plunger 38 in excess of 14 lbs. p.s.i. will cause it to move in the direction of contact member 33 to break contact of that member with terminal 34, shutting off the compressor. Should any pressure leak from the kettle it would automatically be built up again by the pump, since contact member 33 is normally closed, and opens only when pressure in the kettle or line exceeds 14 lbs. p.s.i.

Once the food is placed in the kettle and the timer is set, the machine operates automatically without further attention from the operator until the cooking is completed. It is desirable to remove the food from the fat promptly after cooking.

As heretofore practiced, before the present invention, a kettle full of food (approximately 12 lbs.) when heated promptly generated enough steam from the moisture introduced with the food to raise the kettle pressure to the desired 14 lbs. p.s.i. A lesser amount (4–11 lbs.) would also function satisfactorily, but when it was desired to cook only a relatively small amount of food comprising a few pieces of chicken (2–3 lbs.), it was not possible to generate enough steam in a short time to obtain the desired pressure, without which the cooking was no better than that obtained by open pot cooking, without pressure.

By means of the present invention, a few pieces of food, such as 1 to 4 pounds of chicken, can be cooked satisfactorily, quickly and palatably, in a minimum amount of time, with the air pressure supplementing the steam pressure to quickly achieve the desired maximum of 14 lbs. p.s.i.

In operation, the non-aqueous, edible liquid, such as fat in the kettle, which is heated by electrical immersion heater elements 40 positioned therein, is brought up to a temperature of 320° F.–325° F., said liquid being non-volatizable at this elevated temperature. The heater elements are controlled by a thermostat (not shown) mounted on the control panel 13. The food, either a large or small quantity, is then placed in the kettle, preferably after preparation as herein described. The air-tight cover 14 is then applied and the heat in the kettle causes the moisture therein to turn to steam, raising the pressure. The timer is then set for the period of time it is desired to cook the food, in the case of chicken, preferably 8 minutes. The setting of the time simultaneously sets the compressor into operation, pumping air under pressure into the kettle. The pressure switch 28 is set to break the circuit to the compressor when pressure in the line 25 and in the kettle reaches a value in excess of 14 lbs. p.s.i. Thus, if the pressure exceeds 14 lbs. p.s.i., it will act to overcome the force of tension spring 37, pushing plunger 38 and button 39 into contact member 33, causing it to sweep away from terminal 34, thereby breaking the circuit to the compressor and allowing the pressure to drop. When the pressure drops below 14 lbs. p.s.i., the tension spring 37 will withdraw plunger 38 from contact member 33, closing the circuit and reactivating the compressor.

While reference has been made herein specifically to chicken, other foods may be cooked equally well. Shrimp, hamburgers, frankfurters, potatoes and many other foods may be cooked in this machine quickly, palatably, and with a saving of the food value.

While a preferred form of the invention has been described and shown in the drawings, this is merely for the purpose of illustrating an operative embodiment, and changes in construction and design may be made without departing from the spirit of the invention as defined by the appended claims.

I claim:

1. The method of deep fat frying minimum quantities of chicken, shrimp, hamburgers, frankfurters, potatoes and like foods at high temperatures within a receptable built to accommodate substantially large quantities of food, comprising heating fat in a receptacle to a temperature of from about 320° to 325° F., said fat being non-volatilizable at said temperatures, submerging uncooked food in an amount of from one piece up to 33⅓ percent of the total food capacity of said receptacle in said fat whereby to immediately sear the surface of said food to lock in the natural moisture and juices of the food, immediately closing and sealing said receptable to provide an airtight chamber therein above said fat, immediately introducing air under pressure above said fat in said chamber, raising the air pressure in said chamber to a value of 14 lbs. per square inch, and cooking said minimum quantity of submerged food under said air pressure in said fat for a period of approximately 8 minutes.

2. The method of deep fat frying of from 1 to 4 lbs. of chicken, shrimp, hamburgers, frankfurters, potatoes and like foods under pressure in a vessel having a larger capacity in relation to the amount of food of the order of 12 lbs. of food, at temperatures of from about 320° to 325° F., and under a pressure of approximately 14 lbs. p.s.i., which comprises heating in said vessel to said temperature an edible, liquid cooking fat which is substantially non-volatilizible at said temperatures, submerging from 1 to 4 lbs. of food in said fat, immediately enclosing said vessel in an airtight manner to provide an airtight chamber above said fat, whereby the surface of the uncooked food is seared to lock in the moisture and juices of the food, immediately introducing air under pressure up to a value of 14 lbs. p.s.i. above said fat, maintaining said pressure substantially at said value during the cooking period and cooking the submerged food under said air pressure in said fat for approximately 8 minutes.

References Cited by the Examiner
UNITED STATES PATENTS

| | | | |
|---|---|---|---|
| 2,532,639 | 12/50 | Payne | 126—380 |
| 2,778,736 | 1/57 | Wagner | 99—1 |
| 2,827,379 | 3/58 | Phelan | 99—107 |
| 2,914,063 | 11/59 | Wagner | 126—381 |
| 3,152,911 | 10/64 | Segur | 99—107 |

A. LOUIS MONACELL, *Primary Examiner.*

HYMAN LORD, *Examiner.*